United States Patent [19]

Dost et al.

[11] Patent Number: 4,464,432
[45] Date of Patent: Aug. 7, 1984

[54] THERMOPLASTIC RESIN PASTE IMPREGNATED SUBSTRATES

[75] Inventors: Gerhard Dost, Troisdorf; Walter Gerber, Troisdorf-Spich; Eberhard Jaeger, Heiligenhaus; Erwin Möschter, Neunkirchen; Richard Weiss, Troisdorf, all of Fed. Rep. of Germany

[73] Assignee: Dynamit Nobel Aktiengesellschaft, Troisdorf, Fed. Rep. of Germany

[21] Appl. No.: 297,564

[22] Filed: Aug. 31, 1981

[30] Foreign Application Priority Data

Sep. 4, 1980 [DE] Fed. Rep. of Germany ....... 3033264

[51] Int. Cl.$^3$ .......................... D04H 1/08; B32B 15/00; B32B 17/10
[52] U.S. Cl. ..................................... 428/280; 428/285; 428/290; 428/339; 428/441; 428/483; 428/518; 428/520; 427/246
[58] Field of Search ............... 428/273, 332, 441, 280, 428/339, 290, 518, 520, 483

[56] References Cited

U.S. PATENT DOCUMENTS

| | | | |
|---|---|---|---|
| 3,365,353 | 1/1968 | Witman | 428/170 |
| 3,400,036 | 9/1968 | Heinrick et al. | 428/161 |
| 3,442,694 | 6/1969 | Sookne et al. | 428/441 X |
| 3,471,352 | 10/1969 | Brooke et al. | 156/272.2 |
| 3,528,872 | 9/1970 | Scholl et al. | 428/192 |
| 3,761,422 | 9/1973 | Silver | 428/441 X |
| 3,930,095 | 12/1975 | van Gils et al. | 428/441 X |
| 3,992,842 | 11/1976 | Haage et al. | 428/441 X |
| 4,016,325 | 4/1977 | Flautt et al. | 428/441 X |

Primary Examiner—P. Ives
Attorney, Agent, or Firm—Antonelli, Terry & Wands

[57] ABSTRACT

A process for manufacturing porous textile substrates impregnated with thermoplastic polymeric pastes, especially fleeces or mats, with subsequent gelling out of polymeric paste, which comprises penetrating impregnating one side of a textile substrate with an evacuated paste comprised of a vinyl polymer and/or copolymers of vinyl chloride, while effecting complete displacement of air through the paste and compactly impregnating said substrate.

10 Claims, 10 Drawing Figures

THERMOPLASTIC RESIN PASTE IMPREGNATED SUBSTRATES

The invention relates to a process for manufacturing porous textile substrates impregnated with thermoplastic plastic of polymeric pastes, especially fiberglass-based fleeces or mats, with subsequent gelling out of the plastic pastes.

Coating of substrates with plastics is described in detail in the book by Paul Schmidt, "Beschichten mit Kunststoffen" (Coating with Plastics), Carl Hanser-Verlag, Munich, 1967. Substrates or supports are understood to be woven or non-woven or knitted fabrics made of natural and/or man-made and/or mineral fibers, fleeces, papers, metal films, and sheet metal. Plastic solutions, aqueous plastic dispersions, polyvinyl chloride pastes, and plastic organosols, solid plastics containing plasticizers, and solid plastics not containing plasticizers are used as coating raw materials.

The coating processes are categorized depending on whether they use a spreading method employing a doctor knife or roller coating, pouring, impregnation, dipping, hot-dipping, calendering, hot-rolling, extrusion, laminating, sintering, powder-painting, powder application, or spraying. The raw materials used for coating and the substrates are selected in accordance with the chosen coating process, and appropriate coating processes are used, depending on the existing substrates and coating raw materials. Most of the coating processes described involve unilateral coating of a substrate and result in partial penetration of the substrate, while other coating processes, such as dipping, produce simultaneous, bilateral impregnation of the substrate.

For many applications, a web impregnated with thermoplastic plastic materials is required, wherein the plastic material completely envelops the web or its components, and whereby the enclosure of air between the web and the plastic material is completely eliminated whenever possible.

The advantages of the present invention will be further understood from the accompanying drawings wherein:

FIG. 1 and FIGS. 2a–2g illustrate known apparatus and procedures for coating and/or impregnating sheet materials, such as webs with a thermoplastic material; and FIGS. 3 and 4 illustrate the process of the present invention and suitable apparatus for carrying out this process.

FIGS. 1 and 2a–2g of the drawings, as heretofore mentioned, show the coating processes usually employed for impregnation, in schematic form.

FIG. 1 shows the dipping process, whereby a web 1 is guided through a vat filled with an impregnating agent 2 and then through a pair of metering rolls 3, where the excess impregnating agent is squeezed out. In this process, the air inside the web cannot be completely squeezed out while the web 1 is dipped in the vat, and the air therefore remains in the impregnated web in the form of air bubbles even after the web is squeezed out by the metering roll pair 3. As the dipping speed increases, more and more air is conveyed into the impregnating agent, resulting in an increase in the quantity of air bubbles that remain in the impregnated web. Thus, this process cannot be used to manufacture porous textile webs compactly impregnated with thermoplastic plastic material, so that no air bubbles remain in the impregnated web.

In the spreading method shown in FIGS. 2a, 2b, and 2c, a plastic paste 2 is spread on web 1 by a doctor knife 4. Here again the air is squeezed out downward, but this process is never complete, especially not in the case of thicker fleeces. Pastes which flow readily have the disadvantage that they flow out again easily from the web 1 after squeezing, leaving behind holes or air bubbles which accumulate. Pastes with high viscosity, on the other hand, have poor air penetration properties by definition. The processes shown in 2a with an air squeegee, in 2b with a knife-on-blanket 4, 5 and in FIG. 2e with a knife-over-roll 4, 3 are especially suited for applying coatings on webs.

The screen-printing process shown schematically in FIG. 2d using rotary screen-printing stencil 6 is very similar to the spreading process. It has the advantage over the latter that no fiberglass fragments collect in front of a doctor knife when webs containing fiberglass are coated. In addition, compact air-bubble-free impregnation of porous webs is no longer feasible with the screen-printing process. The relatively short residence time in the gap between the rolls, which does not allow a working speed compatible with good penetration is another obstacle. Readily-flowing pastes, on the other hand, have the disadvantage of running through coarse-mesh webs, leaving holes behind.

FIG. 2e is a schematic representation of the "Rollcoater" process, wherein plastic paste 2 is applied to web 1 by spreader roll 7 and squeezed through the fleece in the roll gap of the associated metering roll 3. The paste, which contains air as a result of this process, is then partially entrained by metering roll 3 and forced again into the web from the other side, so that no air-bubble-free impregnation is possible with the Rollcoater process.

FIGS. 2f and 2g show a coating process using a "slop pad" system, also known as a kiss-coater, which is conventionally used for unilateral coating of webs. The excess plastic paste 2 is removed by an air knife 8 or a metering roll. However, known "slop pad" devices or kiss-coaters are not suitable for compact homogeneous impregnation of porous webs at higher speeds because of the short residence time of the webs on the kiss-coater.

German Offenlegungsschrift No. 20 54 471 describes a process for manufacturing fiber-reinforced semifinished product wherein mineral fiber mats reinforced with a binder are saturated with an aqueous dispersion of a vinyl polymer, after which the saturated fiber mats are dried, and heated to cause the vinyl polymer to gel. This fiber-reinforced semifinished product likewise should contain no air inclusions between the fibers of the web and the plastic or polymer. When plastic solutions or plastic dispersions are used, completely air-bubble-free impregnation can be achieved only when the solvent or the water is completely and slowly evaporated off. This procedure takes a great deal of time and is therefore not feasible at higher speeds (20–30 m/min).

An object of the invention is to produce a reinforced thermoplastic semifinished product, i.e., substrates impregnated with thermoplastic plastic or polymeric materials, wherein a positive bond is created between all parts of the substrate and the surface, with a homogeneous behavior of the impregnated substrate over the entire cross section, and with freedom from air bubbles. It is a further goal of the invention to develop a manufacturing process which permits efficient operation at high operating speeds and allows impregnation at high, achievable substance values. In order to eliminate the inclusion of air bubbles, resulting from the coating material or impregnating material, in impregnated substrates, the invention uses evacuated plastic or polymeric pastes to impregnate porous substrates.

The object which forms the basis of the invention is achieved according to the invention using the process mentioned hereinabove by virtue of the fact that the substrate is penetrated and compactly impregnated from one side only with an evacuated paste based upon a vinyl polymer and/or copolymers of vinyl chloride, with complete displacement of air through the paste. In this fashion, the creation and leaving of air bubble envelopes on parts of the substrate is avoided as a result of the pressure exerted by the substrate as a result of the substrate being tensioned. The process according to the invention and its improvements provides a method of substrate impregnation which creates a positive bond between all the fibers in the substrate and the surface of the substrate, and produces a homogeneously compactly impregnated substrate over its entire cross section. The substrate impregnated according to the invention no longer have easy separability when subjected to external stress originating at the surface, i.e., the substrate no longer tear internally. The freedom from air bubbles of the impregnated substrate results in maximum strength of the bond and permits reliable behavior during subsequent further processing. Due to the compactly impregnation of the substrate by penetration of the paste, the paste forms a uniform coating on both sides of the substrate.

The process according to the invention can be worked especially successfully by using two successive impregnations to accomplish the unilateral penetration of the web. It is critically important that the penetration always occur continuously from the same side of the substrate, so that the inclusion of air is reliably avoided by always permitting the air to escape to the open side before the substrate has been thoroughly and compactly impregnated. The guidance of the substrate and the application of the paste are critically important to the success of the process according to the invention in order to achieve bubble-free impregnation. It is suggested according to the invention that the substrate be guided over one or two kiss-coater rolls with a gap between them for unilateral penetration. The use of a kiss-coater, which is known to be used only for the simplest "slop pad" processes, i.e., unilateral surface coating, makes it possible, surprisingly, with appropriate substrate guidance, to continuously express the air from the porous substrate to be impregnated, gradually, with pressure applied from one side only. The compact impregnation of the substrate is thus accomplished successively. In addition, for example, when fiberglass-containing substrates are used, fiber breakage is avoided. The process according to the invention is especially advantageously worked when the substrate wraps around the kiss-coater roll in an area which corresponds to a wrap angle of at least 50° and preferably between 60° and 120° of the surfaces of the rolls. In this manner, the residence time of the substrate or the contact surface of the substrate on the kiss-coater roll is increased so that a pressure can be exerted for the proper time to squeeze the paste through the substrate. The contact surface of the substrate on the kiss-coater roll per unit time therefore depends on the wrap angle, the roll diameter, and the operating speed. These three parameters can be adjusted as required, depending on the type of substrate selected. The thicker the substrate to be impregnated, the greater the contact surface of the substrate per unit time and hence the longer the time the paste acts under pressure. The average containing time of the substrate on the kiss coater roll lies between 1 to 10 sec. Another advantageous embodiment of the process according to the invention consists in guiding the substrate over a kiss-coater roll for the first impregnation and then guiding it through a gap formed by a pair of rolls for the subsequent second impregnation, whereby the paste squeezed out in the gap from the first impregnation simultaneously forms the material for the second impregnation. As far as the design of the kiss-coater rolls is concerned, the above remarks apply as well. The substrate containing the first impregnation is guided by a pair of rolls for the second impregnation in such fashion that it is fed with the non-penetrated side over the first roll to the gap between the roll pair, so that a bead of excess paste develops in the gap on the penetrated side, which leads to a second penetration, in the same direction as the first penetration i.e., the second impregnation in the gap, thus ensuring freedom from air bubbles in the impregnated substrate.

The processes described above, according to the invention, permit high impregnation speeds of approximately 15–30 m/min, depending on the substance of the substrates, whereby the required residence time for achieving the necessary compact impregnation, free of air bubbles, is accomplished by double impregnation either using two kiss-coaters or by means of one kiss-coater and one roll pair.

Another improvement in the process according to the invention is made possible by the fact that at least one doctor knife acts upon the side of the substrate opposite the one through which the paste penetrates, following penetration. This doctor knife is designed to break up any air bubbles that appear on the upper surface of the substrate. In addition, the completely impregnated substrate can be smoothed before subsequent gelling out of the polymeric or plastic paste material, for example by using a pair of smoothing rolls.

The process according to the invention permits manufacturing air-bubble-free impregnated substrates with a homogeneous characteristic over their entire cross section, wherein the substrate is impregnated with a quantity of paste that corresponds to 5 to 15 times its tare weight. In particular, lighter fleeces can be provided with high quantities of the impregnating agent. The pastes useful as impregnating agents preferably have a viscosity between 1000 and 10,000 cp, and more preferably between 2000 and 6000 cp. A preferred area of application is impregnation of substrates with PVC pastes in a ratio of 40–70 wt % PVC and 30–60 wt % plasticizer for the PVC. In addition, the PVC pastes can obtain additional thermoplastic plastics or polymers such as acrylates, polyvinylidine chloride, polyester, ethylene vinyl acetate, etc., as well as, in a known fashion, fillers, stabilizers, pigments, and auxiliary materials.

Especially favorable results are achieved with the process according to the invention when porous substrates containing binders are used, whereby the binder content is 5 to 30 wt % based on the weight of the substrate.

If possible, binders which are heat-resistant up to 200° C. are preferably used so that they will not dissolve when the temperature rises during the manufacture and subsequent processing of the impregnated substrates. Duromeric binders are preferred, especially polycondensation products like aminoplasts or phenoplasts, for the substrate, for example formaldehyde urea resins, melamineformaldehyde resins, and phenol-formaldehyde resins.

A preferred embodiment of the substrate provides the use of non-woven substrates, especially fiberglass fleece or fiberglass mats with a density of between 15 and 150 g/m$^2$. The fleeces or mats can contain 100% glass fiber but also can contain 100% or less of other fibers as well, e.g., plastic fibers such as polyester fibers or graphite fibers.

The process according to the invention makes it possible to impregnate thoroughly both light and heavy fiberglass mats and fiberglass fleece with a homogeneous, compact air-bubble-free coat of thermoplastic plastic or polymeric material whereby, despite the unilaterial penetration, a product with a homogeneous cross section is produced and the surfaces are likewise made practically identical. The product produced by the process according to the invention is a semifinished product which is used, for example, as a reinforcing layer in multi-layer laminates. Preferred applications include the use of substrates manufactured according to the invention, impregnated with thermoplastic plastic or polymer in the manufacture of waterproof sheeting for building construction, foundation work and civil engineering, floor and wall coverings, as well as technical films, whereby the impregnated substrate is laminated on one or both sides with thermoplastic or elastomeric plastic films or sheets with the same or different composition like the impregnating agent, or with the aid of a coupling agent. The plastic films or sheets can be both compact films or foam films; other laminating materials with bases other than plastic can be used as well. The impregnated substrate, for example, can be laminated continuously and directly with other layers which are permanently bonded to it simultaneously with the gelling out of the impregnated substrate, or at a later point in time, for example by calendering or other known processes.

For example, it is possible to use substrates manufactured by using the process according to the invention with thermoplastic plastics or polymers to make waterproof sheeting for building construction and foundation work, whereby the impregnated substrate is bonded on both sides, for example by means of thermoplastic waterproof sheeting made by calendering, based for example on soft PVC, with a different composition as regards stabilizers, pigments, and fillers, to form a multi-layer sheeting.

It is also possible to make the impregnated substrate according to the invention a transparent substrate, and to coat it with further transparent plastic layers and, for example, to use it as material for swinging doors or the like. Another version consists of substrates with binders based on special thermoplastic plastics, especially acrylates. These are admittedly not resistant to high temperatures, but thermoplastic binders offer the advantage that the binder is softened by coating the substrate, and consequently the stretching properties of the impregnated substrate in particular can be modified as desired.

The process of this invention is described in greater detail in FIGS. 3 and 4 with reference to two embodiments:

Figure 1:
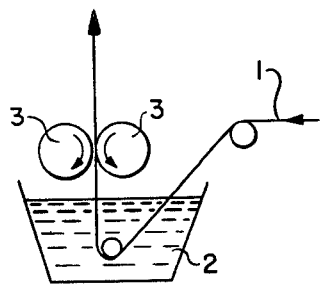
Figure 2A:
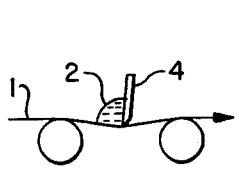
Figure 2B:
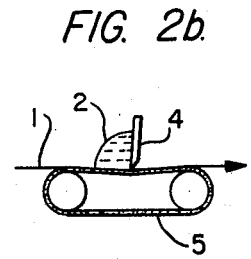
Figure 2C:
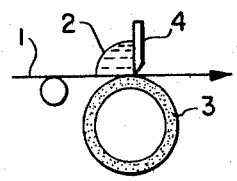
Figure 2D:
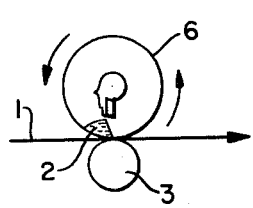
Figure 2E:
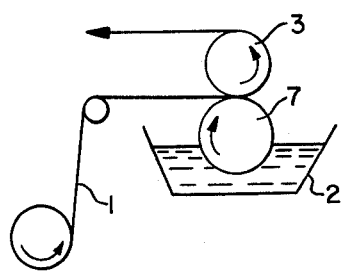
Figure 2F:
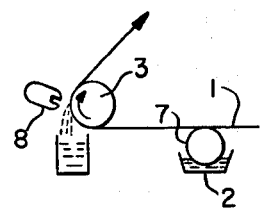
Figure 2G:
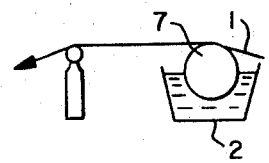
Figure 3:
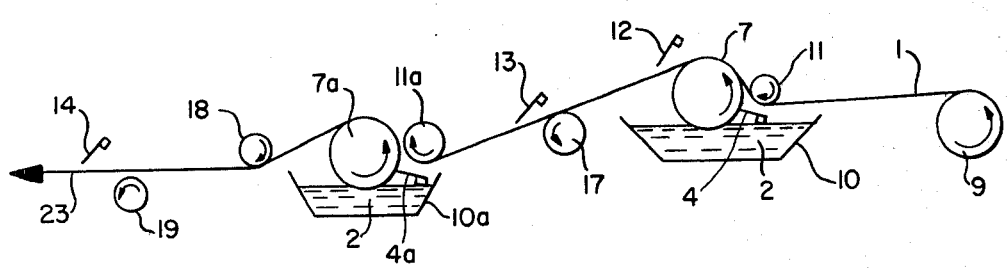
FIG. 3 shows the process using two kiss-coater units.

In the process according to the invention shown in FIG. 3, substrate 1 to be impregnated is pulled off unwinding rool 9 and fed to a first kiss-coater unit. The kiss-coater unit comprises a vat 10 containing plastic or polymeric paste 2. It is important to ensure that the plastic paste is fed into vat 10 continuously and in an air-bubble-free manner during the impregnation process. Spreader roll 7 dips several cm into paste 2. Substrate 1 is guided over a long support surface above spreader roll 7, whereby the guide roll 11 determines the contact surface and wrap angle of the substrate on spreader roll 7. A metering doctor knife 4 is also provided to meter the amount of paste entrained by spreader roll 7. The larger the diameter of spreader roll 7, the greater the support surface of substrate 1 for a given wrap angle. However, the quality of the impregnation or penetration is governed not only by the contact surface of substrate 1 on spreader roll 7, but also by the residence time. The residence time, 1 to 10 sec, in turn, depends upon the operating speed, and the higher the substance or density of the substrate to be impregnated, the greater the residence time of the substrate on spreader roll 7, i.e., that area which must go by within a unit time. The process according to the invention makes it possible to achieve operating speeds of 20-30 m/min for impregnating substrates with densities between 15 and 150 g/m$^2$, whereby compact impregnation up to 15 times the tare weight of the substrate can be achieved. After passing over the first kiss-coater unit, the substrate 1 has been penetrated unilaterally by paste 2 and it then is fed to a second kiss-coater, whereby light trailing doctor knives 12 and 13 act upon the surface in the intermediate stretch, breaking up any air bubbles, while an additional guide roll, which also acts as a distributing roll, can also be provided on the underside. The space between first and second kiss-coater is an average 1 to 2 m.

The second kiss-coater unit operates in exactly the same fashion as the first, with vat 10a, plastic paste 2, spreader roll 7a, guide roll 11a, and metering doctor knife 4a. The second kiss-coater unit continues the unilateral penetration of the paste through the substrate so that air is continuously forced from one side to the other, and the air-free paste produces a compactly impregnated substrate. After it leaves the second kiss-coater unit, the impregnated substrate 23 is fed by additional guide rolls 18 and 19 to another trailing doctor knife 14, and then the gelling-out process comes directly afterward, using a suspension drier or a gelling out tunnel at the appropriate temperatures. After the gelled impregnated substrate cools, it can be wound up and used as a semifinished product for further processing.

Figure 4:
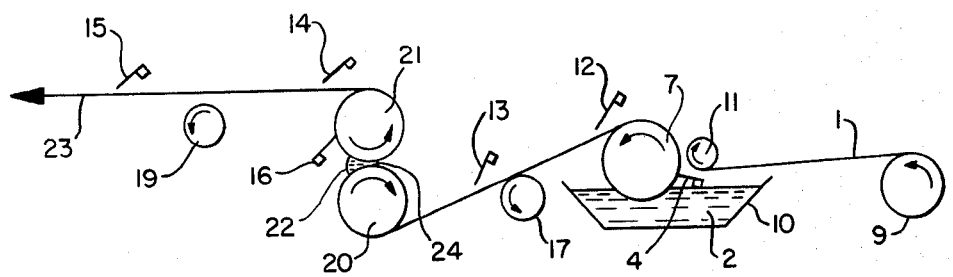
FIG. 4 shows the process using one kiss-coater unit and one roll pair, each shown schematically.

The process according to the invention can also be worked especially advantageously by providing a roll pair instead of a second kiss-coater unit, as shown schematically in FIG. 4. The first impregnation step of the unilateral impregnation of substrate 1 is performed in a manner similar to the process shown in FIG. 3. The substrate leaving the kiss-coater unit is fed around the first roll 20 of roll pair 21 with its upper side, i.e., the side opposite the side resting on the kiss-coater, over a longer wrap angle, and then fed through gap 24 formed by roll pair 20,21. Ahead of gap 24, paste bead 22 forms between substrate 1 and roll 21, acting for all practical purposes as a metering roll, as a result of the excess of the air-bubble-free paste 2 on the underside of the substrate resulting from the first impregnation using the kiss-coater unit. This paste bead 22 again serves as an impregnating agent for the second impregnation of substrate 1, which once again proceeds from the same side as the first impregnation step on the kiss-coater unit. Then the impregnation process is repeated with roll pair 20,21. It is also possible to allow roll 20 to dip slightly into a paste-filled vat in order to add a little extra paste to the substrate in case insufficient paste was entrained by the first impregnation by the kiss-coater unit. It has been found, however, that the use of a roll pair 20,21 is sufficient to achieve the desired compact impregnation with homogeneous distribution over the substrate without any air bubbles.

The following is a description of an example of the process wherein an impregnated substrate is produced by the process shown in FIG. 4.

The impregnating agent, i.e., the plastic paste, is a PVC plastisol with the following composition:
150 parts by weight E-PVC, with a K value of 70
140 parts by weight of diisodecylphthalate
6 parts by weight epoxidized soybean oil
9 parts by weight barium-cadmium stabilizer
1 part by weight anti-aging agent, i.e., hydroxybenzole
0.5 parts by weight UV stabilizer, i.e., bensotriazole The PVC plastisol is mixed and deaerated, by a vacuum of 10 mm Hg and then the such evacuated paste is loaded into the kiss-coater vat, so that the spreader roll is immersed to a depth of 2–5 cm. A substrate composed of fiberglass fleece with a weight density of 45 g/m² and 15 wt % formaldehyde resin as the binder, with a fiberglass fleece 2 m wide, is impregnated with the kiss-coater unit at a speed of 20 m/min, and then fed through a roll pair as shown in FIG. 4 and impregnated again. Then the fiberglass fleece thus impregnated is cured in a suspension drier at approximately 260° C. The result is a fiberglass fleece impregnated compactly and homogeneously with soft-PVC, having a substance or weight density of 500 g/m², a thickness of 0.5 mm and width of 2 m. Such impregnated fiberglass fleece is very useful as reinforcement of f.e., waterproofing sheetings and may be laminated with calendered soft-PVC sheets having preferably a thickness of 0.4 to 1.5 mm on one or both sides. The calendered soft-PVC sheets may be based on the same composition as the impregnating agent of the fiberglass fleece. Preferably the calendered soft-PVC sheet contain some more stabilizers and/or pigments and/or UV adsorber than the impregnating agent.

We claim:

1. A thermoplastic resin impregnated substrate which comprises a porous textile substrate in the form of a carrier sheet and a gelled thermoplastic resin unilaterally penetrating through said sheet and being free of air bubbles; said carrier sheet being impregnated only from one side with an evacuated thermoplastic resin paste comprised of a vinyl chloride polymer having a viscosity between 1,000 and 10,000 cp while effecting complete displacement of air through the paste and through the other side of the carrier sheet and the impregnated carrier sheet, then being heated to effect gellation of said thermoplastic resin.

2. A substrate according to claim 1, wherein said vinyl chloride resin is a homopolymer or a copolymer of vinyl chloride.

3. A substrate according to claim 1, wherein said thermoplastic resin paste comprises a polyvinyl chloride paste containing 40–70% by weight of the polyvinyl chloride and 30–60% by weight of a plasticizer for said polyvinyl chloride.

4. A substrate according to claim 1, wherein the polyvinyl chloride paste contains additional thermoplastic materials including an acrylate, polyvinylidine chloride, polyester or ethylene/vinyl acetate.

5. A substrate according to claim 1, wherein the substrate is impregnated with a volume of paste which corresponds to 5 to 15 times the tare weight of the substrate.

6. A substrate according to claim 1, wherein the porous textile substrate comprises a fiberglass mat or fiberglass fleece with a density between 15 and 150 g/m².

7. A substrate according to claim 1, wherein said porous textile substrate comprises a fiberglass mat or a fiberglass fleece with a density between 30 and 150 g/m² that is impregnated with a volume of said paste which corresponds to 5 to 15 times the tare weight of the substrate, said paste comprising a polyvinyl chloride paste containing 40 to 70% by weight of polyvinyl chloride and 30 to 60% by weight of a plasticizer for the polyvinyl chloride and said carrier sheet impregnated with said thermoplastic resin being further laminated on at least one side with a polyvinyl chloride sheet containing 40 to 70% by weight of polyvinyl chloride and 30 to 60% by weight of a plasticizer for the polyvinyl chloride and having a thickness between 0.4 to 1.5 mm.

8. A substrate according to claim 1, wherein said impregnated carrier sheet is laminated on at least one side with a thermoplastic or elastomeric film.

9. A substrate according to claim 1 wherein said gelled thermoplastic resin forms a uniform coating on both sides of the carrier sheet.

10. A substrate according to claim 9, wherein said evaculated thermoplastic resin paste is a paste which has been deaerated under a vacuum.

* * * * *